June 30, 1942.  A. H. NEULAND  2,288,017
INTERNAL COMBUSTION ENGINE
Filed Jan. 13, 1940  4 Sheets-Sheet 2

INVENTOR.
Alfons H. Neuland

June 30, 1942. A. H. NEULAND 2,288,017
INTERNAL COMBUSTION ENGINE
Filed Jan. 13, 1940 4 Sheets-Sheet 3

INVENTOR.
Alfons H. Neuland

June 30, 1942. A. H. NEULAND 2,288,017
INTERNAL COMBUSTION ENGINE
Filed Jan. 13, 1940 4 Sheets-Sheet 4
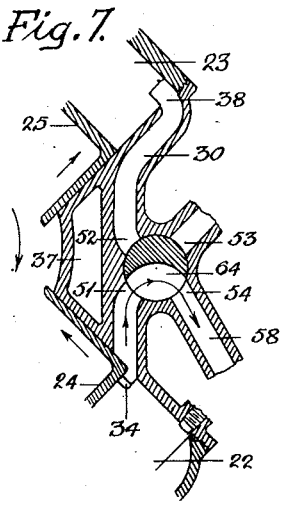
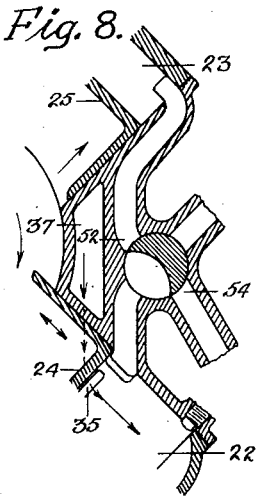
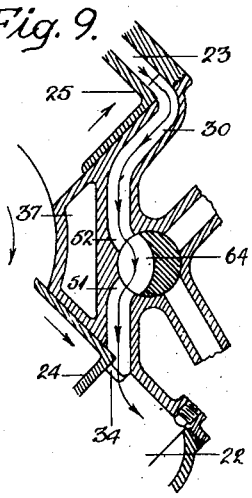
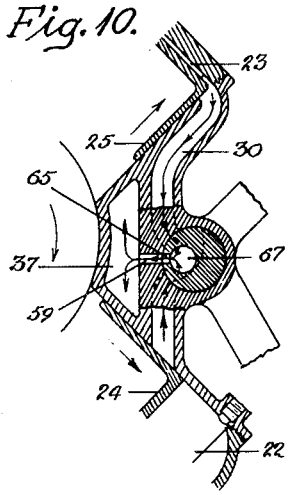
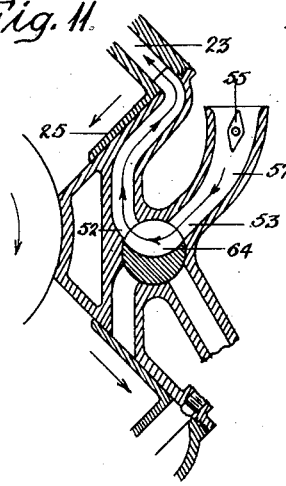
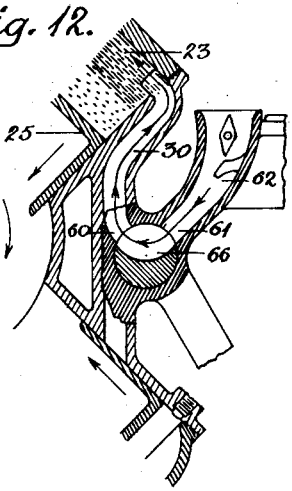
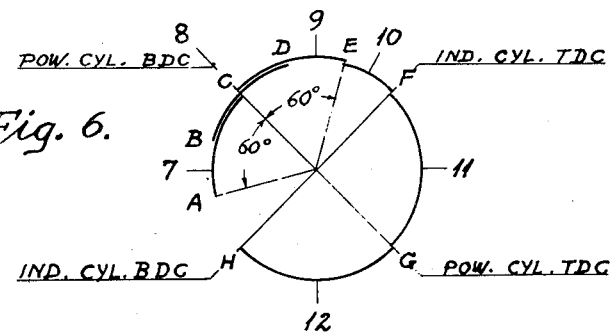
INVENTOR.
Alfons H. Neuland Patented June 30, 1942

2,288,017

UNITED STATES PATENT OFFICE 2,288,017

INTERNAL COMBUSTION ENGINE

Alfons H. Neuland, Cleveland, Ohio

Application January 13, 1940, Serial No. 313,656

13 Claims. (Cl. 123—55)

This invention relates to internal combustion engines and its object is to provide an improved engine of high efficiency, light weight and relatively simple construction.

Generally, my invention resides in a novel arrangement of combustion and induction cylinders and their association with each other, and their pistons with the crankshaft to provide a compact engine in which the combustion cylinders are positively and uniformly charged and are effectively cooled by an air stream.

The present application is in part a continuation of my co-pending application Serial No. 181,086 filed on December 22, 1937, in which I have disclosed an arrangement for coupling an exhaust impelled cooling air stream with an impeller or rotor. One object of the present invention is to improve cooling and to increase the effectiveness in the coupling between an exhaust impelled air stream and a rotor impeller.

The foregoing and other objects, features and advantages of my invention will appear in the following description and from the drawings showing a preferred embodiment of my invention and will hereafter be more fully defined in the appended claims.

Figure 6 is a diagram showing the opening and closing of the ports during each revolution of the crankshaft.

Figures 7, 8, 9, 10, 11 and 12 show diagrammatically the relationships established during each cycle between the pistons and valve and the various connections between the cylinders and intake and exhaust elements.

Figure 1:
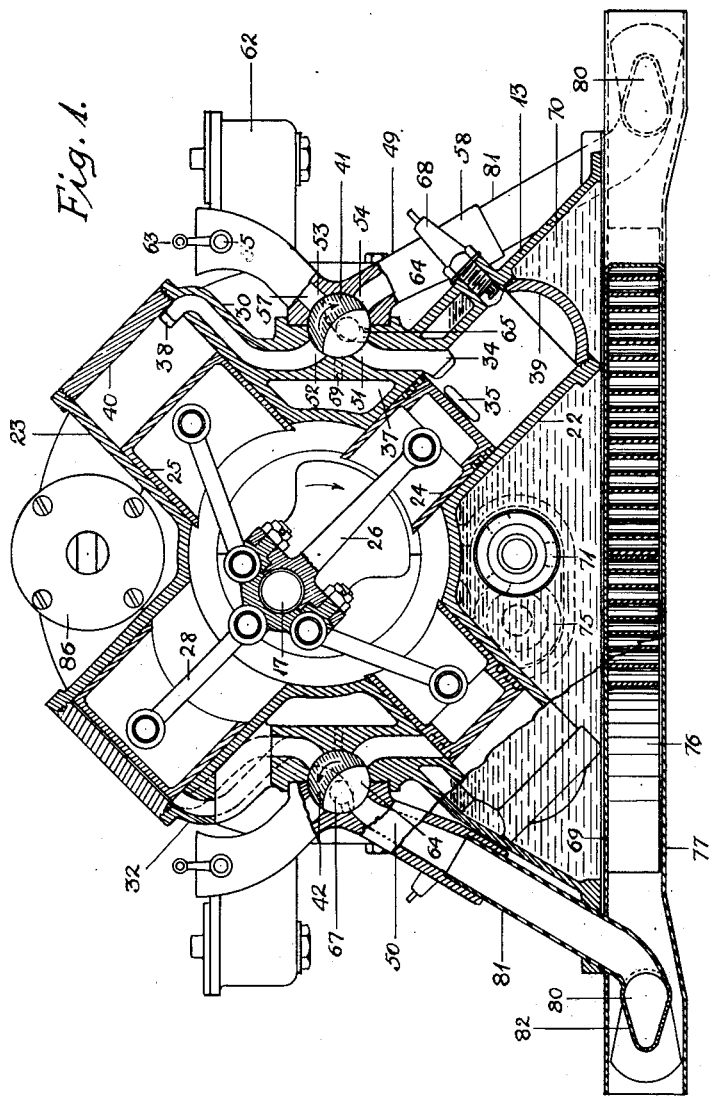
Figure 1 is a cross section thru an engine embodying my invention with portions cut away to show the exhaust and intake elements.
Figure 2:
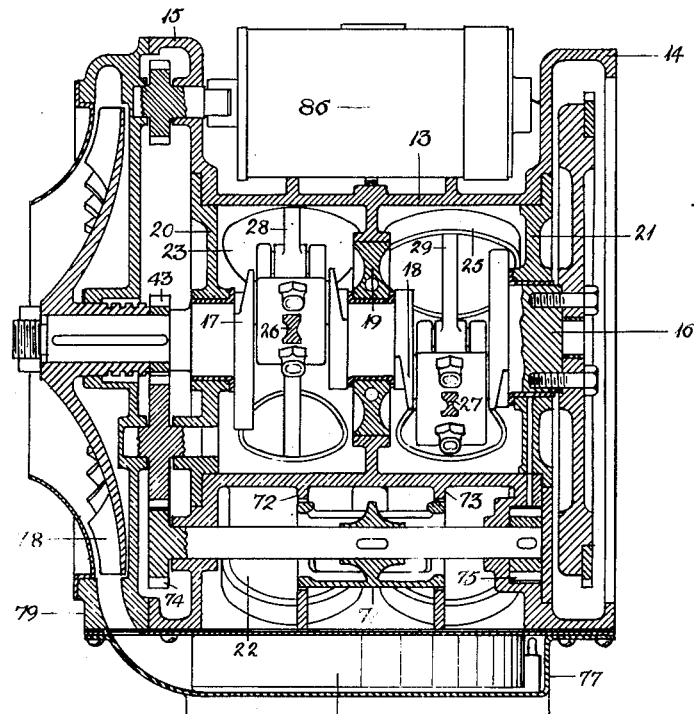
Figure 2 is a vertical section of the engine showing the short crankshaft, coolant impeller, radiating fins and cooling air impeller.
Figure 3:
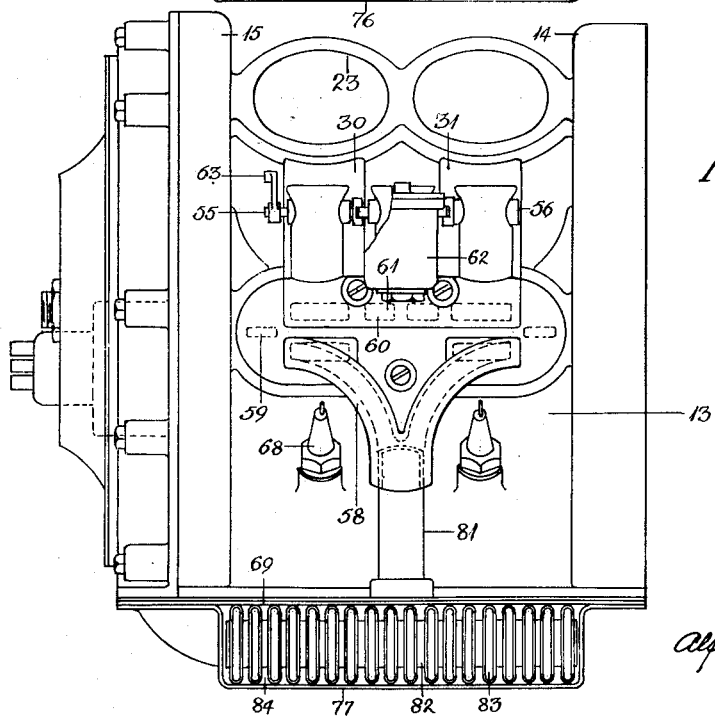
Figure 3 is a right side view of the engine showing the intake and exhaust elements and at the bottom the exhaust ejector for impelling the cooling air stream.
Figure 4:
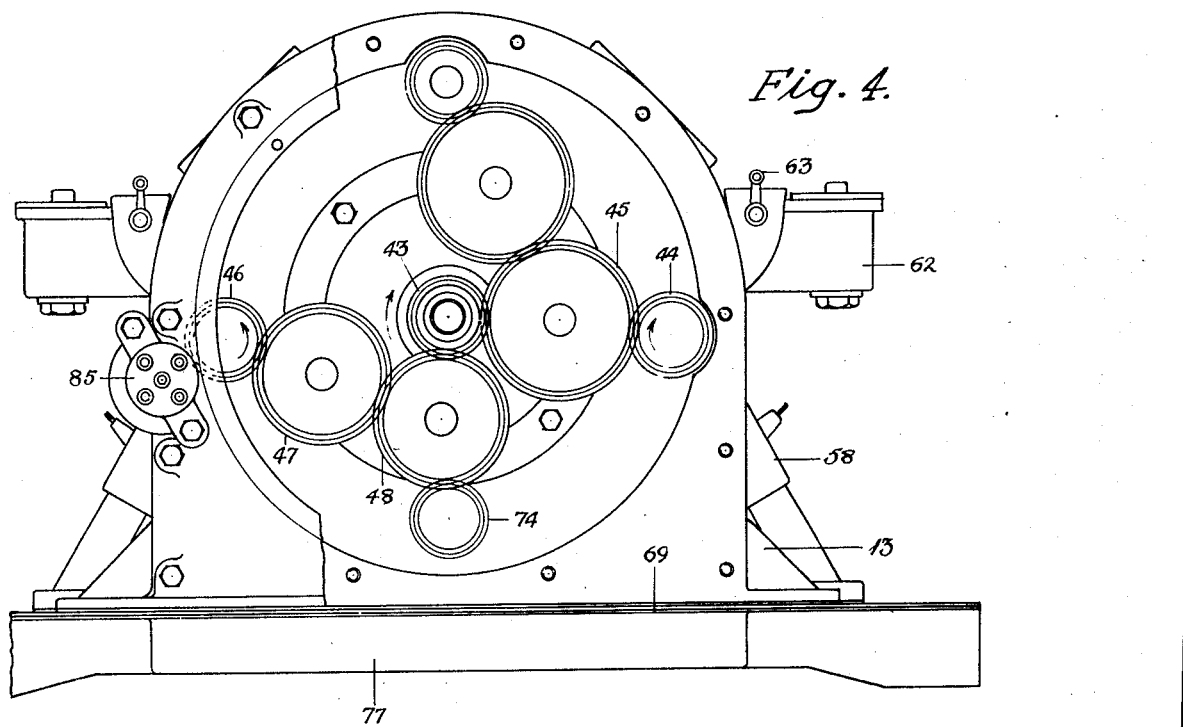
Figure 4 is a front view of the same engine with front cover and rotor impeller removed, and with a portion cut away to show the gear trains connecting the crankshaft with the valves, coolant impeller, etc.

Referring to the illustrated embodiment of my invention and particularly to Figures 1, 2, 3 and 5, the numeral 13 designates an engine casing which may include a fly wheel housing 14 and gear housing 15 formed as a part thereof. A crankshaft 16 provided with cranks 17 and 18 spaced 180° apart is arranged within the casing and supported by a split bearing bracket 19 at its center and by end brackets 20 and 21. One portion of the engine casing is provided with a group of four combustion cylinders 22 preferably formed integral therewith and displaced one from the others angularly and axially so as to form two pairs of in-line cylinders spaced 90° apart. I further provide a like number of induction cylinders 23 arranged in the same manner as the combustion cylinders so as to form a similar group associated with another part of the engine casing and preferably also formed integral therewith. The two groups are arranged with respect to one another so that adjacent combustion and induction cylinders have an angular spacing of 90°. Each combustion cylinder is provided with a piston 24 and each induction cylinder with a piston 25 connected to the cranks of the shaft by the master connecting rods 26, 27 and auxiliary connecting rods, 28, 29 so that each four pistons connected to the same crank form a group and are associated with two combustion cylinders and two induction cylinders.

I further provide a conduit, or connection for the transfer of fluid, for each pair of cylinders comprising one induction and combustion cylinder. The conduits 30, 31 connect each induction cylinder on the right side of the engine, which will hereafter be referred to as the leading induction cylinder, with respect to crankshaft rotation, with an adjacent combustion cylinder, whose pistons are connected to the same crank, and the conduits 32 and 33 connect each trailing induction cylinder on the left side of the engine with an adjacent combustion cylinder whose pistons are connected to opposite cranks. With this arrangement the pistons associated with induction and combustion cylinders in one pair will have the same relation at any point in the cycle of operation as the pistons in any other pair at the same point in their cycle. The uniform charging of the combustion cylinders which is thus secured substantially contributes to the smooth and effective operation of the engine.

Each of the combustion cylinders is provided with a main port 34 and with auxiliary or scavenging ports 35, 36 for connecting the combustion cylinder with a scavenging chamber 37 which may preferably communicate with the scavenging chamber of the adjacent cylinder and the purpose whereof will hereafter be more fully described. The ports in the cylinder wall are arranged so that the piston nearing the end of its expansion stroke will uncover the main port 34 before uncovering the auxiliary ports 35, 36. Each of the induction cylinders is provided with a port 38 in the cylinder wall arranged near the end of the compression stroke. The heads 39, 40 serve as closures for the open ended combustion and induction cylinders respectively.

A rotary valve 41 on the leading side, and a rotary valve 42 on the trailing side of the engine is further provided, connected to rotate preferably at crankshaft speed. The valve 41 is connected to the gear 43 on the crankshaft by means of the gears 44, 45 to rotate in crankshaft direction, and the valve 42 is connected by means of the gears 46, 47 and 48 to rotate in the opposite direction. Each valve is rotatably mounted within a valve housing formed preferably partly by the engine housing and cylinders and partly by a cover 49, 50 secured to the engine housing, easily removable for inspection.

The valve housing on the leading side of the engine is provided with main ports 51, 52, 53 and 54, all arranged in the same plane, port 51 being connected with the main port 34 in the combustion cylinder and port 52 with the port 38 in the induction cylinder thru the conduit 30. Ports 53 and 54 are associated with an inlet duct and with an exhaust duct respectively in the valve housing cover. The upper portion of the valve housing cover is provided with butterfly valves 55, 56 on the leading side of the engine, the valve 55 serving to vary the duct 57 terminating in the intake port 53. The lower part of the valve cover includes an exhaust manifold 58 having one of its branches terminating in the exhaust port 54. Arranged in another plane of the valve housing and preferably near the end of the valve, I provide an auxiliary port 59 communicating with the scavenging chamber 37, and in a centrally located plane of the valve housing, an auxiliary port 60 which is substantially an elongation of the main port 52 leading to the induction cylinder and an auxiliary intake port 61 in the cover communicating with a carburetor 62 and having its butterfly valve connected with the butterfly valves 56, 55 for simultaneous control by the lever 63. While the foregoing description is largely confined to the forward half of the valve housing associated with one induction and one combustion cylinder it will be seen that the rear half of the housing is identically the same and that the valve housing on the trailing side of the engine is identically the same as the one on the leading side above described except that, as heretofore already mentioned, unlike the conduits 30 and 31 which are arranged radially in a plane so as to connect cylinders whose pistons are connected to the same crank, the conduits 32 and 33 are crossed, as particularly shown in Figure 5, so as to connect cylinders whose pistons are connected to opposite cranks.

My invention permits the use of valves of moderate diameter and simple construction. They may be manufactured from a solid rod, have gear teeth cut at one of their ends and have their end portions journaled directly in a bore of the engine casing, to be lubricated in the usual manner. The central portion of the valve, facing the ports, may be provided with a small clearance to reduce friction. Because of the moderate pressures to which the valve is subjected the leakage thru the clearance is inconsiderable.

Each valve portion associated with one induction and one combustion cylinder is provided with a main notch 64 facing the four main ports in the valve housing extending circumferentially so as to connect adjacent ports, is provided with a narrow notch 65 communicating with the main notch and facing the scavenging port in the casing, and is further provided with a notch 66 facing, and adapted to connect, the auxiliary intake ports 60 and 61 leading to the induction cylinder and the carburetor respectively.

Figure 5:
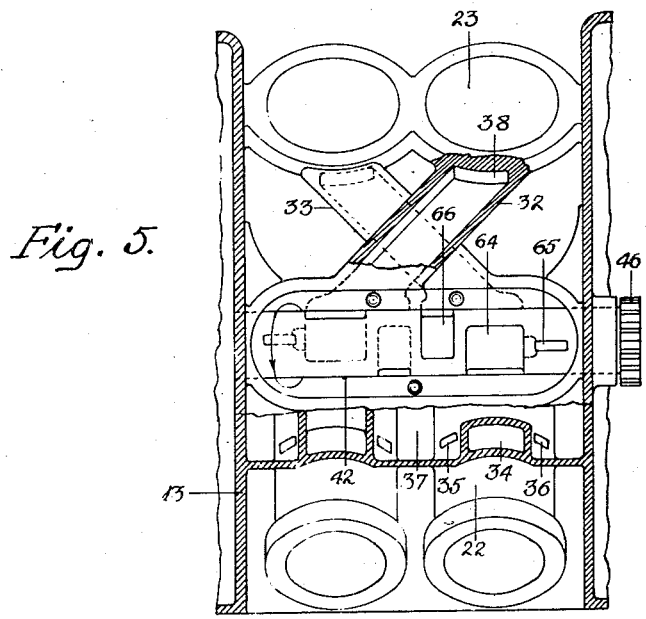
Figure 5 is a left side view of the engine with portions cut away and the valve cover removed to show particularly the ducts in the rotary valve, ports in the cylinders, scavenging chamber and the conduits for cross connecting the cylinders.

From Figures 1 and 5 it will be seen that the auxiliary intake notch 66 trails the main notch by approximately 90° and that the scavenging notch 65 also trails the main notch, with respect to valve rotation, but to a lesser degree. It will be understood that the angular relationship between the several notches in each group depends upon the angular relationship between the ports in the valve housing associated therewith. It will also been seen that the notches forming the other group in the same valve are the same as those in the first group but are angularly displaced therefrom 180°. The notches in both valves are also identical except as to sequence, the valve on the leading side of the engine having the sequence of its notches arranged for rotation in direction of crankshaft rotation and the valve on the trailing side of the engine having the sequence of its notches arranged for rotation in the opposite direction.

The operation of the engine may best be understood from the diagrams in Figures 6 to 12 inclusive showing the various relationships during one cycle of operation, that are established between pistons and a valve portion belonging to one of each group of cylinders composed of one induction and one combustion cylinder.

Figure 7 shows the relationships which are established at the point 7 in Figure 6, and 45° before the piston 24 in the combustion cylinder 22 reaches bottom center. In this position the piston has partly uncovered the main cylinder port 34 and the main notch 64 in the valve bridges ports 51 and 54 in the valve housing and permits the burnt gases from the combustion cylinder to escape into the exhaust manifold 58. The piston 25 in induction cylinder 23 is in an early stage of its compression stroke but the port 52 is kept closed by the valve.

In Figure 8, the piston 24 has reached bottom as shown at the point 8 in Figure 6 and the exhaust port 54 has just closed. However, at the point B in Figure 6, while the exhaust port 54 was still partly open, piston 24 uncovered the two scavenging ports 35, 36, admitting air from the scavenging chamber 37 to the cylinder 22 and serving to clear it of burnt gases. Meanwhile the induction piston 25 has further compressed the fresh charge in cylinder 23 and the valve is just about to open the port 52. Further rotation of the crankshaft opens the port 52 and admits the fresh charge to the combustion cylinder while the flow thru the scavenging ports 35, 36 continues until the point D in Figure 6 is reached when the piston 24 covers these ports.

Figure 9 corresponds to the point 9 in Figure 6. At this point ports 51 and 52 are wide open and the charging fluid is forced into combustion cylinder 22 under pressure which increases with increasing engine speed to whatever value is required to transfer the charge from induction to combustion cylinder. The maximum induction pressure during the cycle is reached at the point E in Figure 6 just as piston 24 covers the main port 34 in the combustion cylinder when piston 25 has nearly reached the end of its compression stroke. In addition to the charge in the small portion still remaining to be displaced in cylinder 23, before piston 25 reaches the end of its compression stroke, a portion of the charge under pressure remains in the duct connecting the cylinders including the conduit 30. One purpose of the scavenging chamber 37 is to receive and store a portion of this residue to be admitted to cylinder 22 during the next cycle.

Figure 10 corresponds to the point 10 in the diagram of Figure 6 and shows that at this point the narrow notch 65 in another plane of the valve, which communicates with the main notch thru the hole 67, registers with the port 59 and admits the residual fluid into the scavenging chamber 37.

Figure 11 corresponds to the point 11 in Figure 6 and shows that piston 25 has entered into suction stroke and that the valve has now reached a position where the main notch 64 bridges ports 52 and 53 and admits a fresh charge of air into the induction cylinder. After piston 25 has completed approximately one half of its suction stroke, the valve closes port 52 and opens the auxiliary intake ports 60 and 61 connecting the conduit 30 and carburetor 62.

This condition is shown in Figure 12, corresponding to the point 12 in the diagram of Figure 6. As heretofore stated the auxiliary notch 66 trails the main notch by a quarter revolution and the figure shows that notch 66 is now in the same angular position formerly occupied by the main notch 64 and now permits a combustible fluid from the carburetor 62 to flow into induction cylinder 23. It will be seen that the air, having been admitted during the early part of the suction stroke, fills the space next to the piston and the gaseous mixture, last to be admitted, fills the space next to the cylinder head. With this arrangement the gaseous mixture first to leave the induction cylinder is not admitted to the combustion cylinder until after the air from the chamber 37 has substantially scavenged the burnt gases from the cylinder. Since the residue or charge last to leave the induction cylinder consists substantially of air alone, and since it is this residue which reaches the scavenging chamber, any portion of the charge which, by reason of the overlapping of the ports may follow the exhaust gases into the exhaust manifold, consist almost entirely of air. This effectively minimizes wastage of the combustible mixture.

As heretofore stated the induction pressure is at a maximum substantially just before the main port 34 in the combustion cylinder closes so that the fluid last to be forced into the cylinder creates considerable turbulence and operates to effectively mix the air and gas portions of the charge to form a uniform mixture before being ignited by the spark plug 68. The butterfly valves in the air intake and carburetor ducts are proportioned and coordinated so as to deliver proportions of air and gas best suited for operation of the engine. The control lever 63 on the leading side of the engine may be connected with that on the trailing side of the engine for simultaneous operation in an obvious manner, not shown.

From the foregoing it is seen that the pistons and valve portion comprising each group cooperate with one another to positively control the induction and exhaust during each cycle. From Figure 6 it is seen that in the illustrated embodiment the exhaust remains open between the points A and B during 60° of crankshaft rotation and that the gaseous fluid is transferred between the points C and E, also during an arc of 60°, but after the exhaust has closed.

It is seen that the charging fluid residue, remaining in the induction cylinder and the ducts after the ports in the combustion cylinder have been covered, is transferred to the scavenging chamber between the points E and F and that the induction cylinder is charged with air between the points F and G and with a gaseous mixture between the points G and H. However it will be understood that the points at which the ports open and close may be modified to meet particular requirements. For instance in engines intended for high speed operation the closing of the exhaust may be made to overlap the opening of the charging port.

While I have described the operation of one group, the other groups, each consisting of an induction cylinder a combustion cylinder and a valve portion, operate in exactly the same way because of the manner in which I connect their pistons to the crankshaft with respect to their cylinders with one another and the sequence and relative positioning of ducts in the valves and the direction of their rotation as heretofore described.

It is seen that in the illustrated embodiment, the group of combustion cylinders is associated with the lower portion of the engine casing and that the casing is open at the bottom. I provide a closure 69 for the bottom of the casing having a large radiating surface adapted to serve as a radiator, a liquid coolant 70 for transferring heat from the combustion cylinders to the radiator and an impeller or agitator 71 for vigorously circulating the coolant between the cylinders and the radiator. The ends of the impeller 71 are arranged within bores in re-enforcing webs 72, 73 between the cylinders and draw coolant from the sides of the casing to be expelled centrally, partly against the radiator at the bottom, and partly towards and around each of the combustion cylinders. The impeller 71 may be connected to the crankshaft by suitable means such as the gear 74 meshing with one of the intermediate gears.

While other suitable liquid coolants may be used in my engine, my arrangement makes the use of the engine lubricating oil suitable for cooling as well as for lubrication. Where lubricating oil is used for both purposes a pressure pump 75 may be for the sake of simplicity, directly connected to the end of the impeller shaft, draw oil from the casing and force it into the crankshaft and other bearings of the engine.

The radiator 69, on its outer surface, is provided with a plurality of closely spaced, curved fins 76, extending from the front towards the sides of the engine. One half of the fins are curved toward the leading side of the engine and the other half are curved toward the trailing side and are partly enclosed by the cover 77, which is open at the front end and at the sides so as to form a large number of narrow, curved ducts for the passage of cooling air from the front towards both sides of the engine. A cooling air impeller 78, secured to the front end of the crankshaft and arranged within the blower housing 79, forces a stream of cooling air thru the ducts which, because of their curvature, is brought into intimate contact with the cooling fins and effectively absorbs the heat therefrom.

Associated with the cooling air stream I provide means for impelling the cooling air with a stream of exhaust gas from the engine. The broad feature of this invention is described and claimed in my co-pending applications Serial No. 181,086 filed Dec. 22, 1937, which has matured into Patent No. 2,209,996, bearing date of Aug. 6, 1940, and Serial No. 314,977 filed January 22, 1940. My present invention includes this feature in combination with a liquid for transferring heat to the air stream and in combination with an impeller co-operating therewith. The air stream is impelled by an exhaust ejector or impeller 80 arranged within an extension of the radiator case on each side of the engine and connected to the exhaust manifold by the exhaust pipe 81. Each ejector consists of a distributing chamber or tube 82 extending the width of the opening and is provided with a plurality of closely spaced thin nozzles 83 arranged flatwise side by side and forming a plurality of narrow ducts 84 intermediate the nozzles for the passage of the cooling air, bringing the exhaust gas stream into close association with the cooling air stream and operating to effectively impell one with the other.

With this arrangement I further secure effective coupling of the exhaust gas stream with the rotor impeller 78 on the engine shaft by means of the air stream. For instance during high engine speeds and light loads the blower pressure is relatively high and the exhaust gas stream is relatively weak so that the air streams flowing thru the ducts 84 at high velocity establish a partial vacuum in the nozzles 83 and serve to reduce the induction pressure which the induction cylinders are called upon to develop. During operation of the engine at heavy loads, the exhaust gas stream establishes a substantial vacuum in the ducts 84 and the vacuum operates to drive the impeller 78, which now operates as a motor and helps drive the crankshaft.

The arrangement whereby a radiator forms a closure for an engine jacket containing a cooling liquid and is effectively cooled by an exhaust impelled air stream is claimed in my copending application Serial No. 324,546, filed March 18, 1940, and the arrangement whereby a rotatable agitator within the engine jacket circulates a liquid coolant within the jacket for the effective transfer of heat from the cylinders to a radiator forming a closure for the engine jacket is broadly claimed in my copending application Serial No. 393,308, filed May 4, 1941.

Ignition current for the spark plugs 68 may be supplied from the distributor 85 conveniently mounted on the engine housing and connected to be driven from one of the gears in the gear case, in this instance at engine speed. A generator 86, mounted between the induction cylinders at the top may also be connected to the crankshaft by means of a gear in the gear case.

While I have shown and described my engine for operation with spark ignition, my engine may also be used for operation with compression ignition, or it may be modified and operated in any other manner well known to the art.

It should be noted that various changes may be made in the details of construction and combination of the various parts of my engine and one or more of the features disclosed herein may be used in the present or other embodiments without departing from the spirit of my invention, and I desire to cover by my claims such changes and other embodiments which may reasonably be included within the scope thereof.

I claim as my invention:

1. In a two stroke cycle internal combustion engine having a crankshaft with a pair of opposed cranks, a pair of in line combustion cylinders, a second pair of in line combustion cylinders arranged substantially at right angles to said first pair of combustion cylinders, a pair of in line induction cylinders arranged substantially at right angles to said first pair of combustion cylinders and a second pair of in line induction cylinders arranged substantially at right angles to said second pair of combustion cylinders for charging said combustion cylinders, a piston for each cylinder connected with said crankshaft so that one of the pistons in each of the pairs of cylinders form a group connected to one of said cranks and the other piston in each of the pairs of cylinders form a group connected to the other crank, and means for connecting each of said combustion cylinders with a corresponding induction cylinder characterized in that each combustion cylinder in one pair is connected with an induction cylinder connected to the same crank and in that each combustion cylinder in the second pair is connected with an induction cylinder connected with the opposite crank.

2. In a two stroke cycle internal combustion engine having a crankshaft including a pair of opposed cranks; a plurality of combustion cylinders arranged in a group and displaced each from the others angularly and longitudinally, a plurality of induction cylinders also arranged in a group and displaced each from the other angularly and longitudinally, a valve housing associated with the combustion and induction cylinders on one side of the engine including a rotary valve connected with the crankshaft to rotate in fixed relation with and in the same direction as said shaft and adapted to connect a combustion cylinder on this side having its piston connected to one crank with an induction cylinder having its piston connected to the same crank, and a valve housing associated with the combustion and induction cylinders on the other side of the engine including a rotary valve connected in fixed relation to said crankshaft but to rotate in the opposite direction thereto and adapted to connect a combustion cylinder having its piston connected to one crank with an induction cylinder having its piston connected to the opposite crank.

3. In a two stroke cycle internal combustion engine, a crackshaft having a plurality of angularly displaced cranks, a pair of angularly displaced cylinders including a combustion cylinder, an induction cylinder and means including a rotary valve for connecting one cylinder with the other, pistons for said cylinders connected to the same crank on said crankshaft, a second pair of angularly displaced cylinders including a combustion cylinder, an induction cylinder and means including a second rotary valve for connecting the cylinders of said second pair with one another, said second pair being arranged with respect to the first so that all combustion cylinders are on one side and all induction cylinders are on the other side of the engine, a piston for each cylinder of said second pair, means for connecting one piston of said second pair to one crank and the other to an angularly displaced crank of said crankshaft, means for rotating said first mentioned valve in the same direction as the crankshaft, and means for rotating said second valve in the opposite direction with respect to said crankshaft.

4. In a two stroke cycle internal combustion engine, a crankshaft, a pair of angularly displaced cylinders including a combustion cylinder and an induction cylinder for charging the combustion cylinder and having pistons connected to said crankshaft so that compression in the induction cylinder continues after the expansion stroke in the combustion cylinder has reached bottom center, and means including a valve operated by rotation of said engine shaft adapted during each revolution of the engine shaft to charge the induction cylinder with a fluid, to exhaust the burnt gases from said combustion cylinder, and to transfer the fluid from the induction cylinder to said combustion cylinder in the order named.

5. In a two stroke cycle internal combustion engine having a crankshaft and a combustion cylinder provided with a port and a piston connected to said crankshaft and adapted to cover and uncover said port; an induction cylinder having a piston also connected to said crankshaft for charging said combustion cylinder with a fluid, a valve housing associated with both said cylinders, and a rotary valve within said housing connected in fixed speed relation with said crankshaft and so as to conduct the exhaust gases from said combustion cylinder as said port is uncovered by said piston and adapted in the next succeeding position to connect the combustion cylinder with said induction cylinder and after said port has been covered by said piston to conduct charging fluid to said induction cylinder from an external source.

6. In a two stroke cycle internal combustion engine having a crankshaft and a combustion cylinder provided with a port and a piston connected to said crankshaft and adapted to uncover said port; an induction cylinder having a piston also connected to said crankshaft for charging said combustion cylinder with a fluid and having a port, an intake conduit, an exhaust conduit, a valve housing associated with both cylinders and both conduits provided with a bore and with passages terminating in said bore and connecting the bore with said intake conduit, exhaust conduit, combustion cylinder port and induction cylinder port, in the order named, and a rotary valve disposed within the bore of said valve housing, provided with a duct connecting adjacent passages in said housing and connected in fixed speed relation with said crankshaft and to rotate in a direction so that the duct in said valve will progressively register with passages leading to said intake conduit, exhaust conduit, combustion cylinder port and induction cylinder port in the order named.

7. In a two stroke cycle internal combustion engine having a crankshaft and a combustion cylinder provided with a port and a piston connected to said crankshaft and adapted to uncover said port; an induction cylinder having a piston also connected to said crankshaft for charging said combustion cylinder with a fluid, a valve housing associated with both said cylinders, and a rotary valve within said housing connected in fixed speed relation with said crankshaft and so as to assume a position to conduct the exhaust gases from said combustion cylinder as said port is uncovered by said piston and adapted in the next succeeding position to establish connection between said cylinders for the transfer of charging fluid from the induction cylinder to said combustion cylinder.

8. In a two stroke cycle internal combustion engine a crankshaft, a combustion cylinder having a piston connected to said crankshaft and provided with a port and a second port arranged so that said piston will uncover said first port before uncovering said second port, a chamber connected with said combustion cylinder through said second port, an induction cylinder arranged substantially at right angles to said combustion cylinder having a piston connected to the crankshaft so as to reach the end of its compression stroke after the piston in the combustion cylinder has covered both ports, and a valve associated with both cylinders operated in response to rotation of said crankshaft and adapted to charge the induction cylinder during its suction stroke with a fluid, to transfer a major portion of said fluid to the combustion cylinder and to store a minor portion of fluid from the induction cylinder in said chamber.

9. In a two stroke cycle internal combustion engine, a crankshaft, a combustion cylinder having a piston connected to said crankshaft and provided with a port and a second port arranged so that said piston will uncover the first mentioned port before uncovering said second port, a scavenging chamber connected with said combustion cylinder through said second port, an induction cylinder angularly displaced with respect to the combustion cylinder for charging it with a combustible fluid and having a piston connected to said crankshaft so as to reach the end of its compression stroke after the piston in the combustion cylinder has reached its bottom center, a source of combustible gas, means and a rotary valve associated with said cylinders, scavenging chamber and source of gas connected in fixed speed relation with the crankshaft and adapted to charge the induction cylinder with air from the atmosphere during the first part and from the source of gas during the latter part of its suction stroke and further adapted to transfer the relatively rich gas mixture into said combustion cylinder through said first mentioned port and the relatively poor mixture into said scavenging chamber.

10. In a two stroke cycle internal combustion engine, a crankshaft, an engine casing having an upper portion and a lower portion, a plurality of induction cylinders arranged in a group and associated with the upper portion of said casing, a plurality of combustion cylinders associated with the lower portion of said casing arranged in a group and angularly displaced with respect to said induction cylinders, and a valve arranged intermediate the upper and lower portions of said casing connected in fixed speed relation with said crankshaft and adapted to periodically connect an induction cylinder with a combustion cylinder.

11. In a two stroke cycle internal combustion engine, an engine casing, a crankshaft, a plurality of angularly and axially adjacent combustion cylinders bunched together to form a group associated with one portion of the casing, a plurality of angularly and axially adjacent induction cylinders also bunched together to form a group associated with another but circumferentially displaced portion of the casing, means for connecting the induction cylinders with said combustion cylinders, pistons for said cylinders and means for connecting the pistons with the crankshaft, a liquid coolant, and an impeller arranged within the casing in substantially uniform proximity to said combustion cylinders and connected with said crankshaft.

12. In an internal combustion engine, an engine casing, a crankshaft, a bank of in line combustion cylinders arranged within the casing having pistons connected with the crankshaft, a second bank of in line combustion cylinders also arranged within said casing but at an angle with respect to the first bank of cylinders and also provided with pistons connected with the crankshaft, a liquid coolant within the casing, and an impeller arranged within the casing in substantially uniform proximity to all the cylinders and connected with said crankshaft and adapted to agitate the coolant within said casing.

13. In a two stroke cycle internal combustion engine: an engine casing; a rotatable crankshaft provided with a plurality of cranks; a group of angularly and axially adjacent combustion cylinders fixedly associated with one circumferential portion of said casing provided with combustion pistons connected with the crankshaft; and a group of angularly and axially adjacent induction cylinders connected with said combustion cylinders and fixedly associated with an angularly displaced portion of said casing with respect to said group of combustion cylinders and provided with induction pistons connected with said crankshaft, the angularly adjacent combustion and induction pistons being connected with the same crank and axially adjacent combustion and induction pistons being connected with different cranks.

ALFONS H. NEULAND.